US008643284B2

(12) United States Patent
Welten

(10) Patent No.: US 8,643,284 B2
(45) Date of Patent: Feb. 4, 2014

(54) LED ASSEMBLY DRIVING CIRCUIT

(75) Inventor: Petrus Johannes Maria Welten, Oss (NL)

(73) Assignee: Eldolab Holdings B.V., Eindhoven (NL)

( * ) Notice: Subject to any disclaimer, the term of this patent is extended or adjusted under 35 U.S.C. 154(b) by 321 days.

(21) Appl. No.: 13/059,218

(22) PCT Filed: Aug. 17, 2009

(86) PCT No.: PCT/NL2009/000159
§ 371 (c)(1),
(2), (4) Date: May 13, 2011

(87) PCT Pub. No.: WO2010/019030
PCT Pub. Date: Feb. 18, 2010

(65) Prior Publication Data
US 2011/0204802 A1    Aug. 25, 2011

Related U.S. Application Data

(60) Provisional application No. 61/089,211, filed on Aug. 15, 2008.

(51) Int. Cl.
*H05B 37/02* (2006.01)
*H05B 41/36* (2006.01)

(52) U.S. Cl.
USPC ............................ 315/123; 315/224; 315/307

(58) Field of Classification Search
USPC ......... 315/123, 193, 297, 224, 291, 307, 302, 315/308
See application file for complete search history.

(56) References Cited

U.S. PATENT DOCUMENTS

| 8,258,719 B2* | 9/2012 | Hoogzaad ...................... 315/291 |
| 8,314,567 B2* | 11/2012 | Ploquin et al. ............ 315/209 R |
| 2006/0238174 A1 | 10/2006 | Russell et al. |
| 2006/0261752 A1 | 11/2006 | Lee |
| 2010/0315016 A1* | 12/2010 | Hoogzaad ...................... 315/224 |
| 2011/0068713 A1* | 3/2011 | Hoogzaad et al. ............ 315/307 |

FOREIGN PATENT DOCUMENTS

| WO | WO 2007049198 A1 | 5/2007 |
| WO | WO 2007069200 A1 | 6/2007 |
| WO | WO 2007093938 A1 | 8/2007 |
| WO | WO 2007141741 A1 | 12/2007 |
| WO | WO 2009013676 A2 | 1/2009 |

* cited by examiner

*Primary Examiner* — Daniel D Chang
(74) *Attorney, Agent, or Firm* — Browdy and Neimark, PLLC

(57) ABSTRACT

A circuit for driving a LED assembly comprising an LED illumination device. The circuit includes a switch, an inductor, in a series connection with the switch, the switch, in its closed state, charges the inductor and in its open state, allows the inductor to discharge. The circuit includes a current measurement element to measure a current flowing through the inductor and/or the LED illumination device in the open and closed state of the switch, and a comparator to compare a signal representing the current measured by the current measurement element with a reference. The switch, inductor and current measurement element establish, in operation, a series connection with the LED illumination device. An output of the comparator is provided to a driving input of the switch for driving the switch between its open and closed state upon a change of an output state of the output of the comparator.

21 Claims, 2 Drawing Sheets

LED ASSEMBLY DRIVING CIRCUIT

The invention relates to a circuit for driving a LED assembly comprising at least one LED illumination device, a device comprising such a circuit and at least one LED illumination device, and an apparatus (such as a light fixture or lighting module) comprising such a device.

WO2007/141741 discloses a circuitry for dimming LED illumination devices. The circuitry comprises an inductor and a switch for switching between a charging and discharging of the inductor. A regenerative (oscillating) circuit is provided to periodically open and close the switch, the regenerative circuit comprising a comparator and a microprocessor. The microprocessor providing for a delay. By varying the delay and/or switching levels of the comparator, an average of the current through the LEDs can be varied.

A problem with the disclosed circuit is that it is relatively complex, as it requires the involvement of a microprocessor: apart from the cost involved, it will place a burden on the data processing capacity of such microprocessor as it provides an additional data processing task. Furthermore, in case of a high load of the microprocessor, the task of providing an output signal may be delayed by other processes, which may result in an undesired deviation of the current through the LEDs from its desired value. Still further, measurement of the current in the LEDs by the resistor Rs1 may be inadequate, as it only measures the current when the transistor T1 is conducting.

The invention intends to at least partly take away one or more of the above problems.

Thereto, according to an aspect of the invention, the circuit for driving a LED assembly comprising a series connection of at least two LED illumination devices, comprises:
a switch,
an inductor, in a series connection with the switch, the switch to in a closed (i.e. substantially conductive) state thereof charge the inductor and in an open (substantially nonconductive) state thereof allow the inductor to discharge (e.g. via a freewheel path comprising e.g. a freewheel diode),
a current measurement element to measure a current flowing through at least one of the inductor and the LED illumination device in the open and closed state of the switch, the switch, inductor and current measurement element being arranged to establish in operation a series connection with the LED illumination device,
the circuit further comprising:
a comparator to compare a signal representing the current measured by the current measurement element with a reference, an output (signal) of the comparator being provided to a driving input of the switch for driving the switch from one of an open and a closed state of the switch to the other one of the open and the closed state of the switch upon a change of an output state of the output of the comparator. Thereby, a low component count regenerative circuit to generate the periodic switching of the switch, has been created, as elements such as a (microprocessor controlled) delay, may be omitted. Furthermore, the series connection of LED illumination devices, inductor and current measurement element allows an adequate measurement of the current. Compared to conventional pulse width modulated switchers, a reduction in component count and cost can be observed also.

A circuit may thereby be generated having a low component count, which may result in small dimensions, low cost, low electromagnetic emission and susceptibility due to short interconnecting conductor traces, etc. A circuit may be provided having a high oscillation frequency, e.g. limited by an output slew rate of the comparator, a switching delay of the switch, etc. A current may be provided in the inductor, which current may average around a desired, nominal level thereof. Thus, by omitting the delay between the comparator output and the switch, a high switching frequency, hence a low ripple of the inductor current is achieved, which low ripple allows an effective operating current of the LED illumination devices to more closely approach a maximum allowable operating current of the LED illumination devices, hence allowing e.g. to make use of more cost effective (e.g. smaller dimensioned) LED's for a given nominal illumination output. Also, the circuit according to the prior art may, at a low intensity, hence at a low duty cycle, operate the LED's below a knee voltage, i.e. at a level where the conduction of the LED will be decreased, requiring some form of a compensation in order to cope with the changing characteristics of the LED's at such low currents: the circuit according to the invention may avoid such compensation. Furthermore, a magnitude of a ripple of the current may be influenced by a magnitude of the above mentioned delays, component values, a magnitude of a voltage over the series connected LED illumination devices, and/or other factors. The current measurement element, such as a series resistor, is connected so as to measure the current through the LED illumination devices and/or the inductor in both the open and closed state of the switch (i.e. also in the state where a free running path, e.g. by means of a diode, conducts the inductor current), so as to allow a precise control by a single current measurement element.

The LED illumination devices each comprise one or more Light Emitting Diodes (LEDs). In case a particular LED illumination device comprises a plurality of LEDs, such LEDs may be provided in a series and/or a parallel connection. The comparator may comprise any electronic element that is able to compare a signal at one input with a signal at another input and to provide an output signal in dependency on the comparison. The reference may comprise any reference, such as reference voltage provided by a reference voltage source, a reference current, etc. The reference may e.g. be an analogue or digitally controlled reference. The switch may comprise any suitable type of switching device, such as a semiconductor switch, e.g. a field effect transistor, a bipolar transistor, a thyristor, etc. The inductor may be provided by any electric structure having an inductance, such as a coil, a conductive trace, a spiraling conductive trace, an on chip inductive structure, etc.

The circuit may comprise at least two series connected LED illumination devices (e.g. each providing a different color), parallel switches to be provided in parallel to each one of the series connected LED illumination devices, and a controller (e.g. a suitable electronic control circuit, or a programmable device, such as a microcontroller, microprocessor, or other programmable device, provided with suitable programming instructions) to drive the parallel switches. Thereby, each of the LED illumination devices may be activated or deactivated by opening respectively closing the parallel switch, so as to direct the current either through the LED illumination device, or through the parallel switch (such as a switching transistor), that may effectively short circuit the LED device in question. Intensities of each of the LED illumination devices may be set by suitable duty cycle modulation of each of the parallel switches and therewith of the LED illumination devices. An intensity of the one or more LED illumination devices may thus be controlled by the respective parallel switch instead of by changing duty cycle and frequency of the current through the inductor, hence providing a more versatile circuit allowing accurate control of the intensity of each LED illumination device individually, at a low component count. A larger dynamic range may be obtained without flickering, as the configuration according to the state of the art reduces a repetition frequency to provide dimming, hence inducing flickering effects at low intensities. The parallel switches may activate the LED illumination devices during short time periods and at sufficiently high repetition rates, so as to possibly avoid such flickering.

The controller may be arranged to close respectively open one of the parallel switches at a time and wait for a predetermined waiting period before opening respectively closing another one of the parallel switches, so as to provide a relatively gradual (e.g. step by step) variation of the load of the circuit and of the electrical output power to be provided by it, which may have a positive effect on many factors, such as accuracy and power efficiency, as it allows the circuit to settle in relatively small incremental changes. Also, dynamic, higher voltage peaks on the LEDs at a time of switching (due to parasitic capacitances, possibly in combination with a parallel capacitor) may thus be diminished. Furthermore, load variations of the circuit, and their possible effects, may be reduced by the controller being arranged to soft switch at least one of the parallel switches, so as to provide a gradual load change by a gradual change over time of the parallel switch from its conductive state to its non conductive state and vice versa. Such gradual load change may also be favored by a capacitor provided in parallel to each of the LED illumination devices.

A feedback may be provided for at least partly compensating an average current to be supplied to the series connected LED illumination devices, the compensation for a variation of the current to be supplied to the series connected LED illumination devices by a variation in a voltage over the series connected LED illumination devices. A variation in the voltage over the series connected LEDs (e.g. due to opening or closing of one of the parallel switches) will result in a change of a waveform of the current through the LED illumination devices: due to the charging and discharging of the inductor current, a "sawtooth" shaped waveform may be observed. A slope of the sawtooth may at least partly depend on the voltage over the series connected LED illumination devices, as thereby a voltage over the inductor, and hence a rate of increase and/or decrease of the inductor current, may be affected. The possible change in the sawtooth or other time profile of the current, may translate into a change in its effective value, which may be observed by a user as a change in light emitted by the LED illumination devices. In order to possibly, at least partly compensate for such as change in the effective current provided by the circuit, a feedback may be provided. The control by a feedback or feed forward may as an input make use of a signal which provides a duty cycle information of the switching. Alternatively, information representing the number of non short-circuited LED assemblies, and/or the voltage over the series connection of the LED illumination devices, may be used as input. A suitable output variable may be a change of the comparator switching level (by changing a value of the reference, by adding an additional input signal to one of the inputs of the comparator, etc) or a change in a duty cycle of operation of the LED illumination devices, so as to compensate for the change in the current effective value.

In an embodiment of the feedback, the feedback comprises a low pass filter, an input of the low pass filter being electrically connected to the switch, an output of the low pass filter being electrically connected to an input of the comparator. Thereby an effective, low component count, hence compact and low cost feedback may be provided. In order to at least partly prevent a change of a behavior of such feedback at a change in a supply voltage (which may e.g. affect a comparator output voltage), the input of the low pass filter may be provided with a voltage limiter to limit an amplitude of a signal to be filtered by the low pass filter. Instead of the low pass filter, many alternatives are possible, such as an integrator, a proportional—integrative—differentiative (PID) controller, etc.

In another embodiment of the feedback, the controller may be arranged to compensate a time of opening or closing one of the parallel switches for the variation of the average current to be supplied to the series connected LED illumination devices due to the change in the voltage over the series connected LED illumination devices. Thereby, an existing controller may, using suitable software instructions, provide for a software compensation by an appropriate changing of the moment in time of opening or closing the parallel switches. Thereby, additional hardware in order to provide for such compensation may be avoided.

The controller may be arranged to soft switch at least one of the parallel switches.

In an embodiment, the comparator comprises a positive feedback circuit. Thereby, a hysteresis may be created for the switching levels of the comparator. Introducing some hysteresis into the circuit may provide for a more predetermined behavior of the circuit: a switching frequency, waveform, etc may thereby depend less on factors such as temperature, component tolerances, inductor value, supply voltage variations, parasitic effects, etc. The hysteresis may be made controllable by providing two or more feedback circuits to be connected to the comparator by suitable switching means, to allow to select a suitable one of the feedback circuits in order to obtain a suitable amount of hysteresis and thereby a suitable alteration of the switching characteristics of the circuit. A similar effect may be achieved in several other ways. Firstly, two or more comparators can be provided, each comparator being provided with a different amount of hysteresis, and switching means to activate a selected one of the comparators. Secondly, different amounts of delay can be provided between comparator and switch (or the delay forming an integral part of the comparator), The delay may result in change of the switching frequency. The delay may be provided by any suitable means: e.g. a digitally controlled delay, an analogue filter, a switching time of one ore more stages, etc. Thirdly, by providing at least two inductors (or in more general terms at least two reactive elements), and suitable switching means in order to use on or more of the inductors for the periodic charging and discharging in the regenerative circuit (i.e. as the inductor which is series connected with the switch). Thereby, the switching frequency of the circuit may be altered. The above proposed changes in hysteresis, delay and/or inductor value, may result in a change in EMI (electromagnetic interference) behavior of the circuit. As the switching frequency can be better defined and made less sensitive on temperature, tolerances and other effects, the EMI behavior of the circuit can be better defined, A further effect on the EMI behavior may be achieved by a modulation (e.g. a dithering) of the switching frequency. By periodically changing the delay, hysteresis, and/or inductor value, the frequency spectrum emitted by the circuit can be modified to some extent, which may facilitate meeting certain electromagnetic compatibility standards. A two bits dithering (e.g. hysteresis, delay) may allow to achieve 4 different switching frequencies, thereby allowing a variety of dithering patterns (up to 16) in order to alter or optimize the EMI behavior.

The above mentioned example of two or more inductor values can also be applied to achieve one or more other effects, as will be explained in more detail below.

Given a certain (inductance) value of the inductor, a certain range in output current and output voltage can be achieved, furthermore the inductance value may have an effect on the switching frequency and power efficiency of the circuit. By selecting different inductor values, an output voltage range on the circuit may be adapted to suit a load situation of the circuit. Furthermore, at high output currents, the inductance value may be increased in order to avoid saturation. Hence, a larger operating range of the circuit (in terms of output voltage, output current, etc) may be provided, while at the same time having an effect on switching frequency and efficiency.

As many contemporary microcontroller circuits have an on chip comparator available, the comparator may be provided as an on chip comparator of a microcontroller circuit, the controller e.g. being provided by the microcontroller circuit. Thereby, component count of the circuit may be reduced even further. The controlling of the hysteretic switcher control aspects (switching the FET based on input from the comparator, synchronization, control of the parallel switches, forming of pulses through either controlling the FET or the parallel switches, controlling the hysteresis, etc. may all be performed by the microcontroller. The circuit may be configured as a floating circuit, a positive supply terminal of the circuit being connected to a positive incoming power supply terminal and the negative supply terminal of the circuit "floating" relative to lowest terminal of the series connected LED illumination devices. By such floating circuit, an operation at a high supply voltage (e.g. for driving a chain of series connected LED illumination devices from a rectified mains voltage) may be easily implemented, and a level shifter between the output of the comparator and the switching input of the switch may be omitted thereby level shifters may then be required to drive the parallel switches.

In order to provide a dimming, or to adapt a value of the average inductor current to the desired intensity range or other characteristics of the LED illumination devices, a control of the inductor current average value may be provided by at least one of a control of an output value of the reference, a controllable delay between the output of the comparator and the switch, an oscillation inhibition circuit to periodically inhibit the free running oscillation and a duty cycle control circuit to control a duty cycle of the operation of the switch. Thereby, on the one hand additional design freedom and electrical power efficiency gain may be obtained, while on the other hand allowing to provide an extremely compact circuit, such as a floating configuration circuit where the parallel switches are omitted and where intensity control is achieved by the control of the inductor current.

A synchronization circuit may be connected to an input of the comparator so as to allow to synchronize the free running regenerative circuit to a synchronization signal. The controller may be arranged to provide the synchronization signal in a synchronous time relation with a switching on or off of one of the parallel switches, so as to synchronize the free switching of the switch to the switching on or off of one of the parallel switches, thereby possibly reducing an effect of a random phase relation between the e.g. saw tooth shaped ripple of the current to be provided to the LED illumination devices, and the switching on or off (in e.g. a duty cycle modulation of the LED intensities) of the parallel switch—thus the activation of one of the LED illumination devices. Thereby, an effect on LED intensity when operating the LED illumination devices at small pulse widths, may be reduced.

Synchronization of the regenerative circuit to the switching of the parallel switches may further be achieved by temporarily forcing an output of the comparator to a certain state (e.g. an output voltage state), thereby temporarily disabling the comparator, e.g. via an enable input thereof, or by delaying a switch moment of the switch that is in series with the inductor until it is in sync with the switching of the parallel switches, which could be implemented by a suitable control circuit, e.g. the controller.

External synchronization, e.g. to bring a plurality of the circuits according to the invention in phase relation to each other, or to bring the circuit in a phase relation to another signal or event, such as in a matrix display wherein a plurality of the circuits each driving a series of LED illumination devices, are applied, may be provided. In an embodiment, the external synchronization may be placed under control of the controller, the controller thereto comprising an input which is arranged to receive an external synchronization signal, the controller being arranged to provide the synchronization signal in a synchronous time relation to the external synchronization signal.

The synchronization may also be applied to shift audible noise of the inductors (e.g. caused by interference effects) to a frequency range above an audible limit. Furthermore, at low intensities of the LED illumination devices, the switch may be kept open for a time period in order to reduce a power consumption of the "free roaming" circuit (if in the audible frequency range) may result in audible noise by the inductor. This may be avoided (or better to say, shifted out of an audible frequency range) by periodically activating the circuit while the parallel switches may be kept conducting, so as to shift the noise to a frequency range above an audible limit.

The above configurations may be provided with a rectification in order to be powered from an alternating current electrical supply, by means of single sided or double sided rectification, with or without power factor compensation, etc.

Further features, effects and advantages of the invention will become clear from the following description and appended drawing, showing a non limiting embodiment of the invention, in which.

Throughout the figures, components having same or similar functions are indicated by same or similar references.

Figure 1:
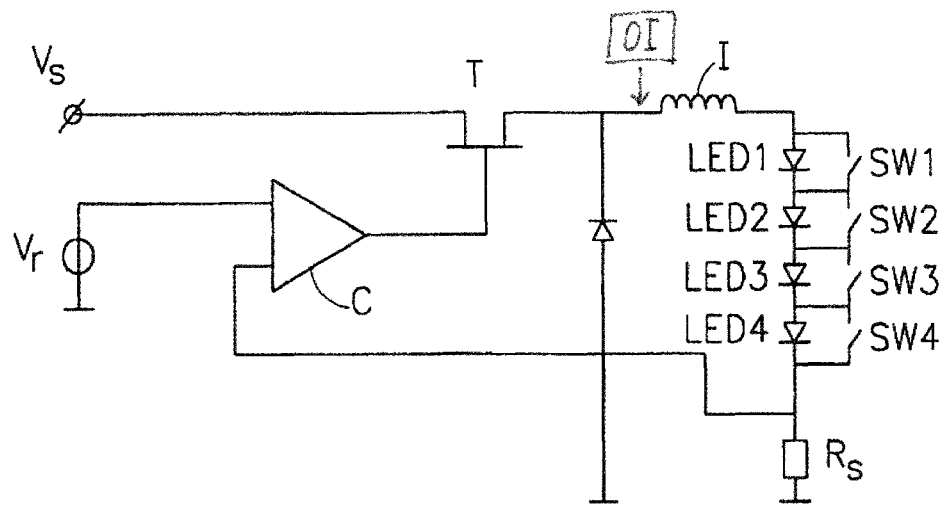
FIG. 1 depicts a schematic diagram of a circuit according to an aspect of the invention.

FIG. 1 depicts a circuit comprising a series connection on LEDs LED1, LED2, LED3 and LED4, a respective parallel switch SW1, SW2, SW3 and SW4 (such as a field effect transistor) being connected parallel to each of the LEDs. An inductor I is provided in series with the LEDs, and a switch, in this example a transistor T, is provided in series with the Inductor. The series connection of transistor T, Inductor I and LEDs is connected to a supply voltage Vs. Closing the transistor T will establish an electrical connection between the supply voltage and the inductor so as to charge (i.e. increase a magnetic energy field of) the inductor, while opening the transistor will interrupt this connection: a diode D will then establish a current path for the inductor. An average current through the inductor, and hence through the series connected LEDs and/or parallel switches, will inter alia depend on a switching (e.g. a switching duty cycle) of the transistor. The switching is controlled by a control loop comprising a series resistor Rs, connected in series with the inductor and LEDs in order to measure a current through the inductor, and a comparator C. The comparator compares a voltage over the resistor Rs with a reference voltage provided by reference voltage source Vr. An output of the comparator is connected to a driving input (e.g. a gate) of the transistor T, in order to switch it from conducting to non conducting and vice versa at a transition of the comparator output from low to high or reverse, depending on having f.e. an inverting coupling circuit or not. In operation, this closing the switch (i.e. transistor T) so as to establish a current path to the supply voltage and charge the inductor, will increase the current in the series connection of inductor, LEDs and series resistor, which will cause the voltage over the resistor Rs to rise, causing the comparator to change its output state, which will open the switch. As a result, the inductor current which follows a path via the diode D, and hence the current in the resistor Rs will decrease, again causing the comparator to change output state, etc, etc. As a result the transistor T will be opened and closed at a high speed, causing a current to flow through the inductor which is determined by a value of the resistor Rs and the reference voltage Vr, the current having a ripple due to the periodic switching. A frequency and an amplitude of the ripple of the switching being in this embodiment determined largely by delays of each of the components, and a rate of increase/decrease of the current in the inductor I. The LEDs can each individually be operated, e.g. in a pulsed way, by opening the respective switch in parallel to it. A level shifter or buffer may be provided between the comparator output and the transistor T in order to adequately drive it and at a sufficiently high speed. The circuit may comprise an oscillation inhibition circuit Oi to periodically inhibit the free running oscillation.

Figure 2:
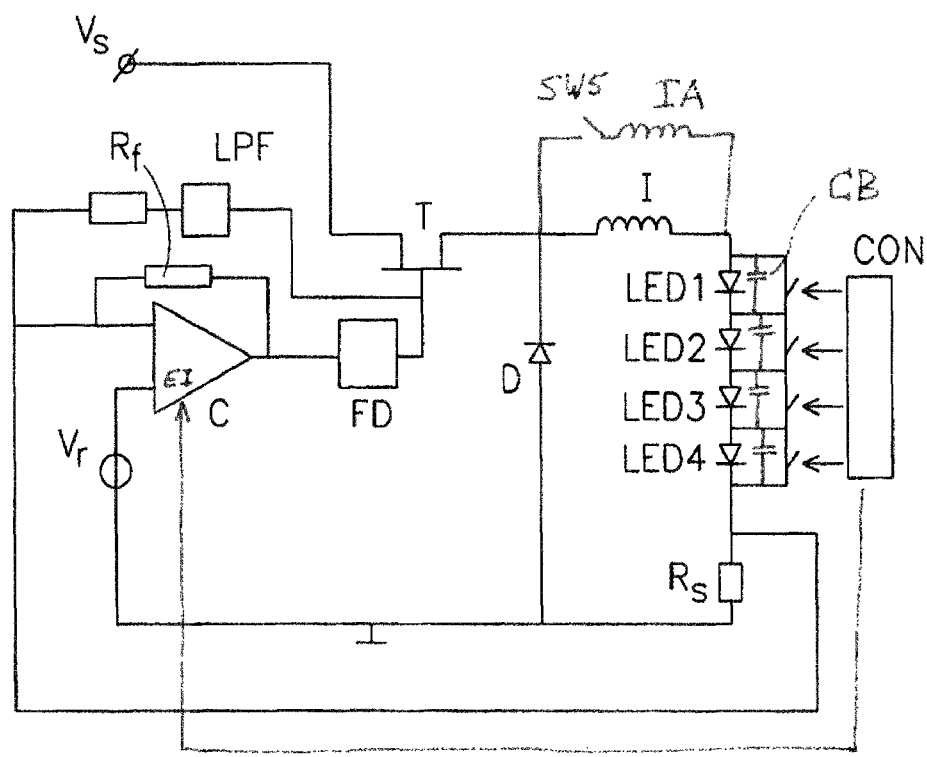
FIG. 2 depicts a schematic diagram of an embodiment of the circuit according to FIG. 1.

FIG. 2 depicts a circuit again comprising a comparator C, transistor T, inductor I, reference source Vr, diode D, LEDs LED1 . . . LED4, each having a parallel switch. A FET driver FD is provided between the output of the comparator and the transistor T (such as a FET transistor), in order to drive the FET at sufficiently high speed and at the required voltage levels. In order to obtain some hysteresis, the comparator is provided with positive feedback via resistor Rf. Thereby, the switching frequency is reduced and switching ripple increased. A behavior of the circuit is thereby however made less dependent on parasitic delays, switching speed, etc of comparator C, transistor T, etc, hence making a behavior of the circuit more precisely defined, stable and reproducible. The hysteresis may be made controllable by providing two or more feedback circuits (not shown in FIG. 2) to be connected to the comparator by suitable switching means, to allow to select a suitable one of the feedback circuits in order to obtain a suitable amount of hysteresis and thereby a suitable alteration of the switching characteristics of the circuit. A similar effect may be achieved in several other ways. Firstly, two or more comparators can be provided (not shown in FIG. 2), each comparator being provided with a different amount of hysteresis, and switching means to activate a selected one of the comparators. Secondly, different amounts of delay can be provided between comparator and switch (or the delay forming an integral part of the comparator), The delay may result in change of the switching frequency. The delay may be provided by any suitable means: e.g. a digitally controlled delay, an analogue filter, a switching time of one or more stages, etc. Thirdly, by providing at least two inductors I and Ia (or in more general terms at least two reactive elements), and suitable switching means SW5 in order to use one or more of the inductors I, Ia for the periodic charging and discharging in the regenerative circuit (i.e. as the inductor which is series connected with the switch). Thereby, the switching frequency of the circuit may be altered. The above proposed changes in hysteresis, delay and/or inductor value, may result in a change in EMI (electromagnetic interference) behavior of the circuit. As the switching frequency can be better defined and made less sensitive on temperature, tolerances and other effects, the EMI behavior of the circuit can be better defined, A further effect on the EMI behavior may be achieved by a modulation (e.g. a dithering) of the switching frequency. By periodically changing the delay, hysteresis, and/or inductor value, the frequency spectrum emitted by the circuit can be modified to some extent, which may facilitate meeting certain electromagnetic compatibility standards. A two bits dithering (e.g. hysteresis, delay) may allow to achieve 4 different switching frequencies, thereby allowing a variety of dithering patterns (up to 16) in order to alter or optimize the EMI behavior.

The above mentioned example of two or more inductor values can also be applied to achieve one or more other effects, as will be explained in more detail below.

Given a certain (inductance) value of the inductor, a certain range in output current and output voltage can be achieved, furthermore the inductance value may have an effect on the switching frequency and power efficiency of the circuit. By selecting different inductor values, an output voltage range on the circuit may be adapted to suit a load situation of the circuit. Furthermore, at high output currents, the inductance value may be increased in order to avoid saturation. Hence, a larger operating range of the circuit (in terms of output voltage, output current, etc) may be provided, while at the same time having an effect on switching frequency and efficiency.

The parallel switches of each of the LEDs may be controlled by a suitable microcontroller CON. A low pass filter is provided from an output of the FET driver FD to the comparator input, the low pass filter to at least partly compensate for an effect of duty cycle changes, thus of the ripple on the current through the inductor, on the average current. The low pass filter may provide an additional signal to the comparator input, to thereby alter a switching level thereof, hence having an effect on the time averaged current through the LEDs. Instead of a low pass filter, other feedback mechanisms may include an integrator, PID controller, etc. In an alternative configuration, a correction of the obtained LED intensities for fluctuations in the effective current supplied by the circuit, may be provided by a suitable adapting of a duty cycle of operation of the LEDs in order to compensate for a deviation of the average current from its intended value. This may be accomplished by measuring a duty cycle of the switching of the transistor T (e.g. similarly to the low pass filter) and calculating a duty cycle correction based thereupon, measuring an overall voltage of the series connected LEDs and calculating a duty cycle correction based thereupon, or directly from the duty cycle information: the controller may then calculate a voltage over the series connected LEDs from the number of opened parallel switches, a change in effective current caused by the particular value of the voltage, and a required duty cycle correction to take account thereof.

Synchronization of the circuit to the switching of the parallel switches may further be achieved by temporarily forcing an output of the comparator to a certain state (e.g. an output voltage state), thereby temporarily disabling the comparator, e.g. by providing a synchronization signal from the controller CON to an enable input Ei of the comparator C. This may for example be implemented in an embodiment wherein the comparator forms a part of an integrated controller, such as a so called PIC controller as manufactured by Microchip. The comparator output can hence be forced to a state (such as the low state) for a certain time, e.g. a switching cycle time part, so as to obtain the synchronization and/or delay. It is remarked that in the embodiments shown, the current through the inductor and LEDs is measured by a resistor, the voltage over the resistor being compared with a reference voltage. Instead thereof, any other suitable arrangement for comparing the current to be supplied to the LEDs may be provided, such as a current mirror and a suitable comparing circuit, etc.

Furthermore, a (buffer) capacitor Cb may be provided parallel to the series connected LEDs, or parallel to each one of the LEDs.

Figure 3:
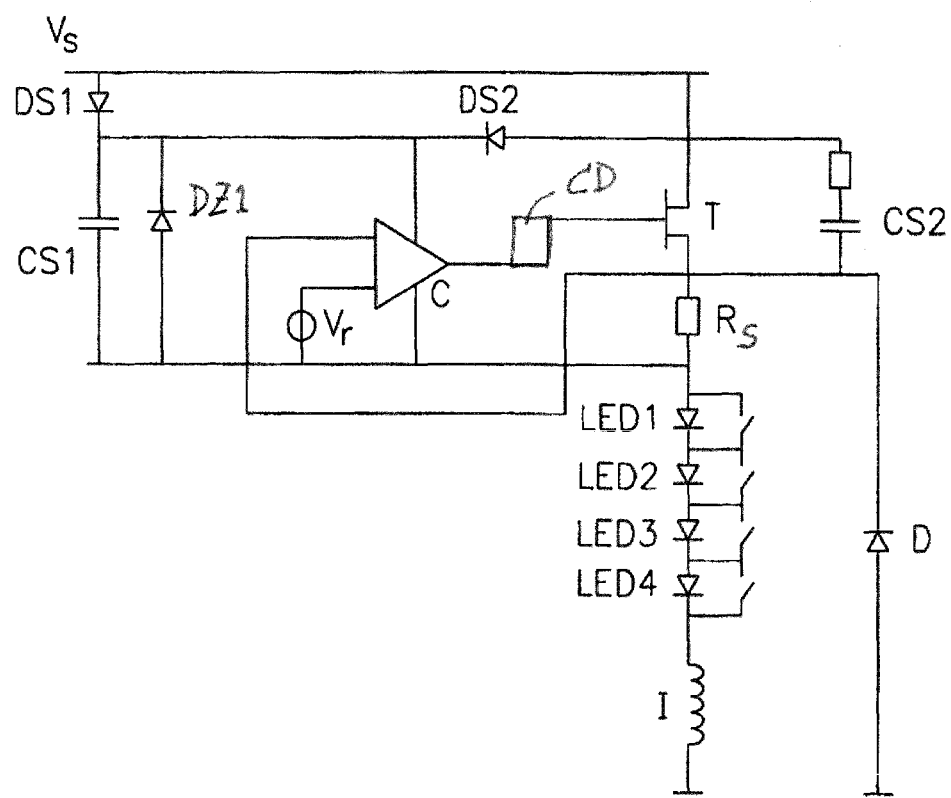
FIG. 3 depicts a schematic diagram of another embodiment of the circuit according to FIG. 1.

A so called "floating" configuration is depicted in FIG. 3. Here, a circuit is depicted which may for example be applied with high supply voltages, such as a rectified mains voltage. A potential of the circuit is kept close to the positive line input voltage, to thereby allow a simple and direct driving of the transistor T without a complex level shifting circuitry. FIG. 3 depicts a circuit again comprising a comparator C, transistor T, inductor I, series resistor Rs, reference source Vr, diode D, LEDs LED1..LED4, each having a parallel switch. The circuit is supplied from the positive supply Vs via diode Ds1. A supply voltage for the comparator C is stabilized by supply capacitor Cs1 and zener diode Dz1. A controllable delay Cd is provided between the output of the comparator C and the transistor T. When the transistor T is conducting, supply capacitor Cs2 may provide electrical power via diode Ds2 and a series resistor. Although 4 LEDs are depicted in FIG. 3, a larger number of series connected LEDs may be provided, in particular at high supply voltages. A buffer capacitor (not shown) may be provided, e.g. parallel to each of the LEDs.

The invention claimed is:

1. A circuit for driving a LED assembly comprising at least one LED illumination device, the circuit comprising
    a switch,
    an inductor, in a series connection with the switch, the switch to in a closed state thereof charge the inductor and in an open state thereof allow the inductor to discharge,
    a current measurement element to measure a current flowing through at least one of the inductor and the LED illumination device in the open and closed state of the switch, the switch, inductor and current measurement element being arranged to establish in operation a series connection with the LED illumination device,
    the circuit further comprising:
    a comparator to compare a signal representing the current measured by the current measurement element with a reference, an output of the comparator being provided to a driving input of the switch for driving the switch from one of an open and a closed state of the switch to the other one of the open and the closed state of the switch upon a change of an output state of the output of the comparator.

2. The circuit according to claim 1, comprising at least two series connected LED illumination devices, and parallel switches to be provided in parallel to each one of the series connected LED illumination devices, and a controller to drive the parallel switches.

3. The circuit according to claim 2, wherein the controller is arranged to close respectively open one of the parallel switches at a time and wait for a predetermined waiting period before opening respectively closing another one of the parallel switches.

4. The circuit according to claim 2, wherein the controller is arranged to at least partly compensate for the variation of the average current to be supplied to the series connected LED illumination devices due to the change in the voltage over the series connected LED illumination devices, by adjusting a duty cycle of at least one of the parallel switches.

5. The circuit according to claim 2, the controller being arranged to soft switch at least one of the parallel switches.

6. The circuit according to claim 2, wherein a capacitor is provided in parallel to each of the LED illumination devices.

7. The circuit according to claim 2, comprising a synchronization circuit connected to an input or output of the comparator or to an enabling input of the comparator.

8. The circuit according to claim 7, wherein the controller is arranged to provide the synchronization signal in a synchronous time relation with a switching on or off of one of the parallel switches.

9. The circuit according to claim 7, wherein the controller comprises an input which is arranged to receive an external synchronization signal, the controller being arranged to provide the synchronization signal in a synchronous time relation to the external synchronization signal.

10. The circuit according to claim 1, wherein a feedback is provided for at least partly compensating an average current to be supplied to the series connected LED illumination devices for a variation thereof by a variation in a voltage over the series connected LED illumination devices.

11. The circuit according to claim 10, wherein the feedback comprises a low pass filter, an input of the low pass filter being electrically connected to the switch, an output of the low pass filter being electrically connected to an input of the comparator.

12. The circuit according to claim 11, wherein the input of the low pass filter is provided with a voltage limiter to limit an amplitude of a signal to be filtered by the low pass filter.

13. The circuit according to claim 1, wherein the comparator comprises a feedback circuit to provide a hysteresis, the hysteresis being settable by at least one of feedback circuit switching and switching between different comparators each comprising a different feedback circuit.

14. The circuit according to claim 13, being arranged to influence or dither a switching frequency of the circuit by at least one of an inductance value setting, a controllable delay and a controllable hysteresis.

15. The circuit according to claim 1, wherein at least two inductors are provided and switching means to activate at least one of the at least two inductors in the circuit so as to set an effective inductance value.

16. The circuit according to claim 1, wherein a controllable delay between the comparator and the switch is provided in the circuit.

17. The circuit according to claim 1, wherein the circuit is configured as a floating circuit, a positive supply terminal of the circuit being connected to a positive incoming power supply terminal.

18. The circuit according to claim 1, wherein a control of the inductor current average value is provided by at least one of a control of an output value of the reference, a controllable delay between the output of the comparator and the switch, an oscillation inhibition circuit to periodically inhibit the free running oscillation and a duty cycle control circuit to control a duty cycle of the operation of the switch.

19. A device comprising a circuit according to claim 1 and at least one LED illumination device to be driven by the circuit.

20. An apparatus comprising a device according to claim 19.

21. The circuit according to claim 1, wherein a controllable delay forming an integral part of the comparator, is provided in the circuit.

* * * * *